Patented Aug. 28, 1934

1,971,743

UNITED STATES PATENT OFFICE 1,971,743

PROCESS OF REDUCING ORGANIC COMPOUNDS

Heinrich Bertsch, Chemnitz, Germany, assignor, by mesne assignments, to American Hyalsol Corporation, Wilmington, Del., a corporation of Delaware No Drawing. Application November 13, 1930, Serial No. 495,534. In Germany November 25, 1929

15 Claims. (Cl. 260—156.5)

It is known that, by the reaction of alkali metals, especially sodium, and lower alcohols, a large number of organic, unsaturated compounds, which contain ethylene, carbonyl and cyanide groups or other unsaturated groups, with the addition of hydrogen or the extraction of oxygen or other atoms or atom groups, can be converted into the corresponding, wholly or partially saturated compounds. In certain cases, the reaction takes place also with saturated, oxygen-containing groups, with extraction of the oxygen, as for example, with the fatty aromatic alcohols of the type of phenyl-methyl-carbinols. This generally usable reduction process, however, has heretofore attained but little technical importance, because the reaction, under ordinary methods, requires large excesses of sodium and alcohol, and even then gives but inadequate results. The alcohols employed in these processes have been those lower alcohols having up to ten carbon atoms in the chain.

It has now been discovered that a material increase in output can be obtained with less consumption of alkali metal, in some cases down to the theoretically required amount or even less, when the reaction between the alkali metal and a lower alcohol is carried out in an atmosphere of hydrogen under pressure. This pressure is produced by using a closed reaction vessel and excess quantities of alkali metal, or else by forcing molecular hydrogen into the vessel. Both means may also be employed together.

To facilitate the reaction, the alkali metal, instead of being in the form of coarse lumps as usual, may be employed in finely divided state, for example, by melting sodium in xylol and vigorously stirring, whereby a dispersion of the alkali metal in the inert solvent is formed, and bringing this dispersion into reaction with the alcoholic solution of the organic substance to be reduced.

In this way, a large number of organic compounds can be smoothly converted in large quantities into derivatives rich in hydrogen but poor in oxygen.

Example 1

200 g. pyridin are dissolved in 700 g. absolute alcohol and are brought into reaction with 350 g. sodium. The reaction mixture, which heats considerably of itself, is brought up to 130° C. by external heat, while the pressure is raised to 20 atmos. by forcing in molecular hydrogen. The mixture is kept at the said temperature and pressure for from 1 to 2 hours. In this way, there is obtained, with the calculated quantity of sodium, a practically quantitative conversion of the pyridin into piperidin, while with the ordinary process without pressure, very great excesses must be employed to obtain approximately quantitative yields.

Similarly to the formation of piperidin from pyridin, the following compounds, for example, can be formed:

Ethyl-benzol from phenyl-methyl-carbinol;
Phenyl-ethyl-alcohol from enol-phenyl-acetaldehyde;
Methyl-phenyl-carbinol from aceto-phenon;
Tetramethyl-diamino benzhydrol from tetramethyl-diamino-benzophenon (Michler's ketone);
Benzyl-toluol from phenyl-tolyl ketone;
Pentandiol (1.4) from valerolacton;
Hexadecylamine from palmitonitril;
1.4 dihydro -α- methyl - naphthaline from α- naphtho-acid-ethyl ester;
Secondary butyl benzol from dimethyl-styrol;
Tetra-hydro-naphthol and -naphthyl-amine from naphthols and naphthyl-amines;
Hexa-hydro-benzoic acid from benzoic acid;
Tetra-hydro-chinolin from chinolin;
Pyrazolin from pyrazol;
Amino-undecan from nonyl-methyl-ketoxim;
Ethyl-amine from acetamide.

Example 2

200 g. cocoanut oil are dissolved in one liter of n-butyl-alcohol and brought into reaction with 90 g. sodium in a closed autoclave. The temperature of the reaction mixture, because of the exothermic heat developed, rises very rapidly to about 100° C., the manometer shows about 5 atmos. pressure. After the reaction has proceeded for one hour, the mass is heated to 140° C., whereby the pressure rises to about 15 atmos. The sodium has now completely passed into solution. The final pressure of 15 atmos. corresponds to the pressure of the hydrogen from the sodium present in excess, while the hydrogen from the theoretically calculated amount of sodium is utilized. The reduction takes place almost quantitatively. After the cooling and reduction of the pressure, the mass is diluted with water and the alcohol mixture is separated from the watery soda lye. The butyl alcohol is separated by fractionization from the higher fatty alcohols, resulting from reduction of the glyceride of the cocoanut oil. To prevent the saponification of the ester moderate quantities of carbonic acid can be forced into the reaction vessel during the reducing operation.

Instead of cocoanut oil, other fatty acid glycerides or mixtures of such or other esters of monobasic or poly-basic acids can be used when esterified with bivalent or multi-valent alcohols.

The same results, namely increased yield and saving of alkali metal and lower alcohol, can be obtained by producing the pressure by an inert gas, particularly nitrogen. In this way, a practically quantitative reduction can be obtained, in many cases, with the theoretical amount of alkali metal. In general, it has been found advisable to use about 10% in excess over the theoretically necessary amount of the alkali metal.

*Example 3*

300 g. castor oil are dissolved in 1000 liters n-butyl alcohol, and are brought into reaction with 90 kg. sodium. By forcing in nitrogen, the pressure is raised to 50 atmos. The mixture is then heated to 140° C., whereby the pressure rises to about 100 atmos. This temperature and pressure are maintained for from 1 to 2 hours. Then it is cooled, and relieved of pressure, diluted with water, the watery soda lye is separated out, the alcohol layer washed with water until the reaction is neutral, the wash water drawn off and then the butyl alcohol is separated by distillation from the octa-decylic-glycol, resulting from the reduction of the castor oil. The actual output amounts to 50% of the theoretical amount.

This application is a continuation in part of applicant's copending application Serial No. 472,764, filed August 2, 1930.

Having thus described the invention, what is claimed as new and desired to be secured by Letters Patent is:

1. In the process of reducing organic compounds employing alkali metals and lower alcohols, the step comprising maintaining the reaction mixture under superatmospheric pressure in excess of about 15 atmospheres during said reaction.

2. A process in accordance with claim 1 in which said reaction under superatmospheric pressure is maintained in the presence of molecular hydrogen.

3. A process in accordance with claim 1 in which said reaction under pressure is maintained in the presence of hydrogen developed from the use of an excess of the alkali metal.

4. A process in accordance with claim 1 in which said reaction is under a pressure of about 15 to 100 atmospheres and is maintained in the presence of hydrogen introduced therein.

5. A process in accordance with claim 1 in which the pressure is produced by means of an inert gas introduced therein.

6. The process of reducing organic compounds comprising treating a reducible organic compound with an alkali metal in a finely divided condition and with a lower alcohol, and maintaining the mixture during said reaction under superatmospheric pressure of hydrogen produced by the reaction of the metal and lower alcohol.

7. The process of reducing organic compounds comprising treating a reducible organic compound in the presence of hydrogen with an alkali metal in a finely divided condition and with a lower alcohol, and maintaining the mixture during said reaction under superatmospheric pressure in excess of about 15 atmospheres.

8. The process of reducing organic compounds comprising treating a reducible organic compound with an alkali metal in a finely divided condition and with a lower alcohol, and maintaining the mixture under superatmospheric pressure during said reaction, said pressure being produced by means of an inert gas introduced therein.

9. A process according to claim 6 in which said reducible organic compound is a glycerine ester of a fatty acid.

10. The process of reducing organic compounds comprising treating a mixture of glycerine esters of fatty acids with an alkali metal in a finely divided condition and with a lower alcohol, and maintaining the mixture under superatmospheric pressure during said reaction.

11. In the sodium and alcohol method of reducing organic compounds, the improvement comprising employing about the theoretical quantity of sodium, said quantity not being more than about 10% in excess of the theoretical amount and maintaining the reacting mixture under superatmospheric pressure.

12. In the sodium and alcohol method of reducing organic compounds, the improvement comprising employing a quantity of sodium not in excess of about 10% of the theoretically required amount and maintaining the reacting mixture under superatmospheric pressure of from 15 to 100 atmospheres.

13. In the sodium and alcohol method of reducing organic compounds the improvement permitting the use of lesser quantities of sodium and alcohol than heretofore found necessary, comprising subjecting the organic compound to be reduced and the lesser quantities of sodium and alcohol to a heating under superatmospheric pressure in excess of about 15 atmospheres until the reduction has taken place.

14. The process of hydrogenating organic bases comprising treating a reducible organic base with an alkali metal in a finely divided condition and with a lower alcohol, and maintaining the mixture under superatmospheric pressure during the reaction.

15. The process of hydrogenating unsaturated organic compounds comprising mixing an unsaturated organic compound with an alkali metal and a lower alcohol and reacting the same under superatmospheric pressure until hydrogenation of the organic compound occurs.

HEINRICH BERTSCH.